United States Patent [19]
Tomioka et al.

[11] B 3,994,015
[45] Nov. 23, 1976

[54] OVERLOAD PROTECTION CIRCUIT FOR TAPE RECORDING AND/OR REPRODUCING APPARATUS

[75] Inventors: Masao Tomioka, Kawaguchi; Yasunori Orihara, Tokyo, both of Japan

[73] Assignee: Sony Corporation, Tokyo, Japan

[22] Filed: Aug. 28, 1974

[21] Appl. No.: 501,253

[44] Published under the second Trial Voluntary Protest Program on February 3, 1976 as document No. B 501,253.

[30] Foreign Application Priority Data

Aug. 30, 1973  Japan.................. 48-101819[U]

[52] U.S. Cl.............................. 360/85; 360/95; 360/96
[51] Int. Cl.²................ G11B 15/24; G11B 15/66; G11B 23/04
[58] Field of Search................ 360/85, 95, 96; 242/195, 185, 189–190, 194, 198; 179/6 R

[56]  References Cited
UNITED STATES PATENTS

| 3,692,940 | 9/1972 | Konno et al. | 179/6 R |
| 3,702,383 | 11/1972 | Iraga et al. | 360/85 |
| 3,711,649 | 1/1973 | Ando | 179/6 R |
| 3,769,470 | 10/1973 | Curtis | 360/95 |
| 3,783,200 | 1/1974 | Jantzen et al. | 360/85 |

Primary Examiner—Alfred H. Eddleman
Attorney, Agent, or Firm—Lewis H. Eslinger; Alvin Sinderbrand

[57]  ABSTRACT

In a cassette tape device having tape guide means movable around a tape guide drum, the operating time of the tape guide means is measured to actuate a protecting circuit to stop the tape drive motor if the operative time of the tape guide means exceeds the estimated operating time, as such excessive time would be indicative of trouble in the guide means.

12 Claims, 3 Drawing Figures

OVERLOAD PROTECTION CIRCUIT FOR TAPE RECORDING AND/OR REPRODUCING APPARATUS

BACKGROUND OF THE INVENTION

1. Field of the Invention

This invention relates to magnetic video tape apparatus, and particularly to an overload protection circuit operative during loading and unloading operations of the tape.

2. The Prior Art

Magnetic video tape apparatus, such as that disclosed in U.S. Patent application Ser. No. 354,992, filed Apr. 27, 1973 and issued June 28, 1974 as U.S. Pat. No. 3,821,805, and assigned to the assignee of the present application, includes means for withdrawing a loop of tape from the cassette by means to a tape engaging assembly. The assembly includes a support ring that rotates about a tape guide drum in which a magnetic head assembly is installed. The support ring has a pinch roller and several tape guide pins and is driven by a direct current (DC) motor.

In the apparatus described in the aforesaid U.S. patent, there is a chance of malfunctioning of the apparatus during the tape loading or unloading operations whereby movement of the support ring may be prevented, for example if the magnetic tape that has been withdrawn becomes tangled in the mechanism. Other problems can arise to interfere with free rotation of the DC motor. In that event, the DC motor used as a driving source for the support ring may be overloaded. The effect of the overloading is to cause the motor to heat up and, in the worst case, to catch on fire or to ignite nearby inflammable material.

It is one of the objects of the present invention to provide means to detect the possibility of malfunctioning of tape loading apparatus and to interrupt the supply of current to the motor that drives the apparatus, thus preventing the generation of excess heat.

Further objects will become apparent from the following description together with the drawings.

BRIEF SUMMARY OF THE INVENTION

According to the present invention a time constant circuit is provided and is actuated when the motor that drives the support ring of the video tape device is energized. At the end of a predetermined length of time, which is slightly longer than the usual times for loading or unloading tape, the time constant circuit provides an output signal in cooperation with a level detector. If the driving motor that turns the support ring to carry out the loading or unloading operation has not already been turned off as the result of the actuation of a limit switch or cassette switch or the like when the support ring reaches its final position, the level detector provides a signal that turns off the current to the driving motor.

DESCRIPTION OF THE PREFERRED EMBODIMENTS

Figure 1:
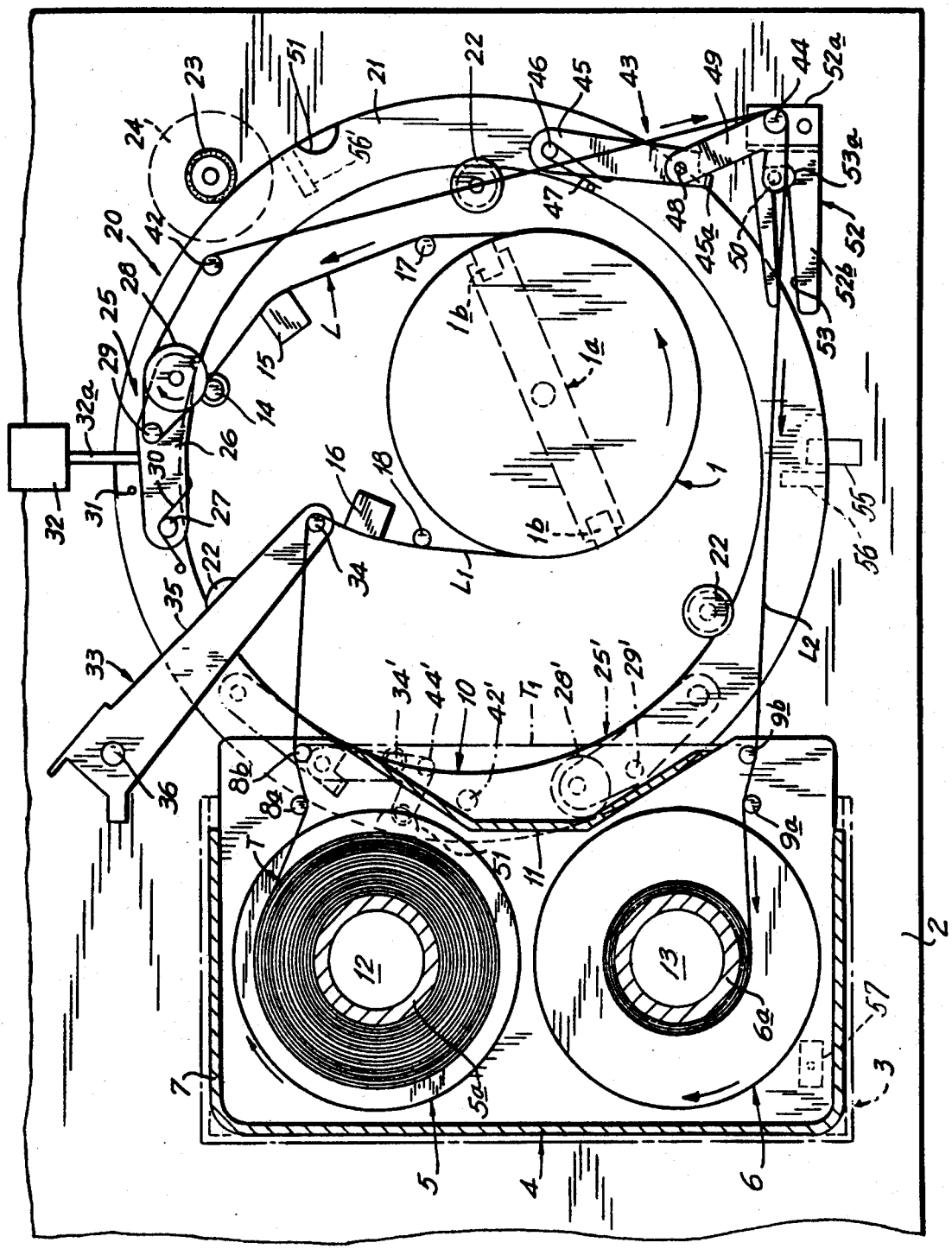
FIG. 1 is a plan view of magnetic video tape apparatus to which the present invention is applicable.

FIG. 1 shows a magnetic video tape recording and/or reproducing apparatus to which this invention is applied. The apparatus shown is of the type disclosed in detail in U.S. Pat. No. 3,821,805, and it comprises a cylindrical tape drum 1 mounted on a chassis 2 and having a circumferential slot or gap (not shown). A rotary magnetic head assembly 1a (appearing in broken lines) is rotatably mounted in the drum 1 and comprises one or more magnetic heads 1b which are moved along the slot or gap, that is, in a circular path substantially coinciding with the peripheral surface of drum 1.

A chassis 2 supports a cassette holding device, shown schematically in broken lines and indicated generally by the reference numeral 3, in front of the guide drum 1. The device 3 is movable between a raised position, in which it is located to receive a tape cassette 4, and a lowered or operative position, in which the cassette is positioned for a recording or reproducing operation. The tape cassette 4 includes a supply reel 5 and a take-up reel 6 rotatably contained within a housing 7 and having a magnetic tape T wound thereon. The tape T extending between reels 5 and 6 is guided about guide pins 8a and 8b adjacent the reel 5 and about guide pins 9a and 9b adjacent the reel 6 so that the tape normally follows a path that includes a run $T_1$ indicated in broken lines. The run $T_1$ extends between the guide pins 8b and 9b and across an opening 10. The opening 10 extends along the side and bottom portion of the housing 7 directed toward the guide drum 1 when the cassette 4 is received by the holding device 3. Access to the interior of the cassette housing 7 through the opening 10 is limited by a partition 11 that extends along the edge of the opening 10 in the bottom wall of housing 7 from a point near the guide pin 8b to another point near the guide pin 9b, and which is spaced inwardly from the run $T_1$ of the tape.

Two reel support shafts 12 and 13 extend upwardly from the chassis 2 and are respectively engageable by the hubs 5a and 6a of the supply reel 5 and the take-up reel 6 when the holding device 3 is lowered to its operative position with the cassette 4 received therein. Suitable drive assemblies (not shown) may be provided for driving the take-up reel support shaft 13 in the direction winding the tape T on the take-up reel 6 during recording, reproducing and fast-forward operations of the apparatus, and for driving the supply reel support shaft 12 in the direction for rewinding the tape on the supply reel 5 during rewinding operation of the apparatus.

The recording and/or reproducing apparatus is further shown to include a capstan 14 which is suitably driven from a drive motor (not shown), a fixed magnetic head assembly 15 for recording and/or reproducing audio and control signals, an erasing head 16 and tape guides 17 and 18, all of which are mounted on the chassis 2 at predetermined spaced apart positions, as shown. In order to operate the magnetic recording and/or reproducing apparatus, it is necessary to load the tape from the cassette 4 on the holding device 3 about at least a portion of the circumferential surface of the guide drum 1 for scanning by the rotary magnetic head assembly 1a associated with the guide drum, and further to engage the magnetic tape with the capstan 14 so that the latter will drive the tape. The tape also engages two fixed magnetic heads 15 and 16. When it is desired to remove the cassette 4 from the apparatus at the conclusion of a recording or reproducing operation, it is necessary to unload the tape by unwrapping it from around the drum 1 and to return the tape to the cassette 4.

In the illustrated apparatus, a device 20 for performing the above-described tape loading and unloading functions generally includes a support member 21 which is preferably in the form of a ring, as shown, and which is rotatable about the guide drum 1 in a circular or arcuate path that extends under the opening 10 of the cassette 4 positioned by the holding device 3. The support ring 21 may be disposed eccentrically with respect to the guide drum 1, to provide a relatively large space between the ring and the drum for accommodating the capstan 14, the heads 15 and 16, the tape guides 17 and 18. The support ring 21 is shown to be rotatably supported by grooved rollers 22 that engage the inner periphery of the ring 21 and which are suitably mounted above the chassis 2. In order to turn the support ring 21 about the guide drum 1, the outer periphery of the ring 21 is, for example, frictionally engaged by a drive roller 23 driven by a DC motor 24.

Mounted on the support ring 21 is a tape engaging assembly 25 which includes a support arm 26 pivoted, at one end, on a pin 27 projecting upwardly from the ring 21; a freely rotatable, upstanding pinch roller 28 carried by the opposite or free end portion of the arm 26; and a tape engaging member, or pin, 29 extending upwardly from the arm 26 intermediate its ends. The tape engaging assembly is located on the support ring 21 so that, when the support ring is turned to its operative position to place assembly 25 in the position shown in full lines in FIG. 1, the pinch roller 28 is adjacent the capstan 14 for cooperation with the latter in driving the magnetic tape. In the apparatus as shown, a spring 30 acts on the support arm 26 to urge the latter outwardly relative to the ring 21 and against a stop 31 to provide a small gap between the pinch roller 28 and the capstan 14. An additional mechanism 32 may be provided to pivot the support arm 26 in the direction to press the pinch roller 28 against the capstan 14. Such additional mechanism 32 may be simply a solenoid having an armature 32a which is extended to press against the arm 26 in response to the energization of the solenoid during a recording or reproducing operation of the apparatus.

When the support ring 21 is turned in the clockwise direction through approximately 250° from its operative position shown in full lines on FIG. 1 to its starting or inactive position, the tape engaging assembly is at the location 25' indicated in broken lines in FIG. 1. It will be apparent that, with support ring 21 at its starting or inactive position, the downward movement of holding device 3 with a cassette 4 positioned thereon causes the pinch roller and the tape guiding member at the positions indicated at 28' and 29', respectively, to project upwardly into the opening 10 of the cassette housing 7 at the side of the tape run $T_1$ facing away from the guide drum 1.

Tape loading and unloading device 20 is further down to include a tape shifting assembly 33, which is shown in FIG. 1, as including a tape shifting pin 34 projecting upwardly from one end of a support arm 35 which extends swingably over the ring 21 from a pivot pin 36 carried by the chassis 2. The movements of the arm 35 are controlled so that, with the ring 21 in its operative position, the tape shifting pin 34 is in the position shown in full lines in FIG. 1 and, with the ring 21 in its starting or inactive position, the tape shifting pin is at the position 34' indicated in broken lines in which it also projects upwardly into the opening 10 of the cassette housing 7 at the side of the tape run $T_1$ facing away from the guide drum 1.

An upstanding tape guide pin 42 is also mounted on the support ring 21 at a fixed location spaced by a relatively small distance from the pinch roller 28 in the clockwise direction so that, when the support ring 21 is in its starting or inactive position, such tape guiding pin will be at the location 42' indicated in broken lines to project upwardly into the opening 10 of the cassette housing 7 received by the lowered cassette holder 3.

The illustrated tape loading and unloading device 20 further comprises a tape guiding assembly 43 which is mounted on the support ring 21 and includes a tape guiding member, or pin, 44. As shown and disclosed in detail in U.S. Pat. No. 3,821,805, the tape guiding member 44 is mounted on the support ring 21 for movement relative to the latter from an inner position 44'' indicated in broken lines to an outer position shown in solid lines. In the inner position 44', the tape guiding member is spaced from the pinch roller 28' by a relatively small distance along the ring 21 in the clockwise direction. When the support ring 21 is in its starting position, both the pinch roller in the position 28' and tape guiding member in the position 44' are relatively close together, and both of them project upwardly into the cassette opening 10. When the ring 24 rotates to its tape-operative position with the pinch roller 28 and the tape guiding member 44 shown in full lines in FIG. 1, the tape guiding member 44 is spaced outwardly from the support ring 21 and is also spaced a relatively large distance from the pinch roller 28 in the clockwise direction along the support ring 21. In order to make possible the foregoing movements of the tape guiding member 44 relative to the ring 21, the tape guiding assembly 43 includes an arm 45 pivoted, at one end, on a pin 46 carried by the ring 21 and being urged in the counterclockwise direction relative to ring 21 by a spring 47. The free end portion of the arm 45 carries a pin 48 on which there is pivoted one end of a generally L-shaped support arm 49 having the tape guiding member, or pin, 44 projecting upwardly therefrom. The free end of the L-shaped arm 49 has a locating pin 50 depending therefrom. Further, the free end of the arm 45 has an upwardly bend tab 45a engagable by the arm 49 to limit clockwise turning of the arm 49 relative to the arm 45. When the support ring 21 is in its starting, or inactive, position, the turning of the arm 45 in the counterclockwise direction by the spring 47 is limited to the position shown in broken lines in FIG. 1. The limiting effect is due to the engagement of the depending pin 50 with the arm 49 in a recess 51, which is formed in the top of the support ring 21 and which is then at the position 51', and by the engagement of the tab 45a with the adjacent arm 49. With the arms 45 and 49 being thus located, the arms 45 and 49 extend generally along the ring 21 from the pivot pin 46 in the direction toward the pinch roller 28, and the tape guiding member, or pin, 44 is at its inner position relatively close to the pinch roller 28.

In order to move the tape guiding member 44 from such inner position to its outer position in response to turning of the support ring 21 from its starting position to its operative position, the tape loading and unloading device 20 is further shown to comprise an actuating member 52 which is fixedly located on the chassis 2 at a location adjacent the support ring 21 past which the pivot pin 46 moves during the turning of the support ring 21 between its starting and operative positions. The actuating member 52 includes a base portion 52a secured to the chassis 2 and an elongated, elevated portion 52b which projects from the base portion 52a over the outer periphery of the ring 21. The elevated portion 52b has an elongated slot 53 opening at the free end of the portion 52b for receiving the locating pin 50 of the tape guiding assembly 43 as the ring 21 is moved from its starting or inactive position toward its operative position. The slot 53 diverges from the ring 21 in the direction from its open end toward its opposite end which terminates in a laterally enlarged locking portion 53a.

The tape loading and unloading device 20, insofar as it is described above, operates as follows:

Starting with the support ring 21 in its starting or inactive position so that the tape engaging assembly 25, the tape guiding assembly 43, the tape shifting pin 34 and the tape guiding pin 42 are in the positions shown in broken lines at 25′, 43′, 33′, and 42′, respectively, in FIG. 1. A cassette 4 is placed on holding device 3 and the latter is lowered to its operative position, as hereinafter described, causing the pinch roller 28′, the tape engaging member 29′, the pins 34′ and 43′, and the tape guiding member 44′ to extend upwardly into the cassette opening 10 at the side of the tape run $T_1$ facing away from the guide drum 1. The motor 24 is then energized to cause the drive roller 23 to turn the support ring 21 counterclockwise. Such rotation of the ring 21 causes the tape engaging member 29 to draw a loop L of the tape T from the cassette 4 and to wrap a side $L_1$ of the tape loop about a portion of the periphery of the guide drum 1. It will be noted that, as the tape loop L is thus formed by the tape engaging member 29, the pinch roller 28, the pins 34 and 42, and the tape guiding member 44 are all disposed within the tape loop. During continued turning of the ring 21 in the counterclockwise direction, the tape loop L is progressively extended and its side $L_1$ is further wrapped about the periphery of the guide drum 1, while the other side $L_2$ of the tape loop L is engaged successively by the tape guide pin 42 and the tape guiding member 44 and is thereby held away from the periphery of the guide drum 1. In the course of the counterclockwise turning of the ring 21, the locating pin 50 enters the slot 53 of the actuating member 52 and moves along the slot 53 toward the locking portion 53a. As the pin 50 moves along the slot 53 and the pivot pin 46 continues in the counterclockwise direction along the circular path of the ring 21, the arms 45 and 49 initially swing as a unit in the clockwise direction about the pivot pin 46 and, when the locating pin 50 reaches the closed end of the slot 53 defined by the locking portion 53a, the arm 49 jack-knifes counterclockwise relative to the arm 45 and causes rapid turning of the arm 45 in the clockwise direction about the pivot pin 46. Thereafter, continued movement of the pivot pin 45 counterclockwise along the circular path of the ring 21, while the locating pin 50 is retained in the locking portion 53a of the slot 53, causes the arm 49 to turn clockwise relative to the arm 45 until the arm 49 again abuts against the tab 45a on the arm 45, for example, as shown in full lines in FIG. 1. Thus, the tape guiding member 44 is moved to its outer position relative to the ring 21 and, in so doing, is also relatively widely spaced from the tape engaging member 29 and the pinch roller 28 in the direction along the support ring 21.

As the support ring 21 nears its operative position shown in full lines in FIG. 1, the support arm 35 is turned about the pivot 36 to swing the shifting pin 34 to the position shown in full lines by mechanical engagement means (not shown here) between the support ring 21 and the arm 33. Thus, the shifting pin 34 acts on the tape loop side $L_1$ between the drum 1 and the guide pin 8a to cause the loop side $L_1$ to engage the guide pin 18 and the erase head 16. When the support ring 21 attains its operative position, the tape loop side $L_1$ between the drum 1 and the tape engaging member 29 is engaged with the guide pin 17 and the head assembly 15 and passes between the capstan 14 and the pinch roller 28, which is adjacent the capstan. Thus, the tape loading operation is completed and the operation of the motor 24 is normally discontinued. Upon the completion of the tape loading operation, a recording or reproducing operation can be initiated, as hereinafter described, and during such operation the tape T is transported about the guide drum 1 from the supply reel 5 to the take-up reel 6, for example, by energizing the solenoid 32 to cause the pinch roller 28 to press the tape against the rotating capstan 14 and by suitably rotating the take-up reel shaft 13.

At any desired time, the recording or reproducing operation can be discontinued, and an unloading operation initiated by suitably energizing the motor 24 to drive the support ring 21 clockwise from the position shown in full lines to the position shown in broken lines in FIG. 1. During such turning of the ring 21, one or the other of the reel shafts 12 and 13 may be suitably rotated to take-up, on the respective reel 5 or 6, the slack tape that results from the movement of tape engaging member 29 and the consequent reduction of the size of the tape loop L. Further, the action of the tape guiding assembly 43 is reversed in passing from the condition shown in full lines in FIG. 1 to the condition shown in broken lines.

Upon the return of the support ring 21 to its starting, or inactive position, the tape T is fully unwrapped from the guide drum 1 and restored to the run $T_1$ between the guide pins 8b and 9b in the cassette 4. Further, the pinch roller 28, the tape engaging member 29, the tape guiding pin 42, and the tape guiding member 44 are restored to the positioning within the cassette opening 10 as indicated in broken lines at the positions 28′, 29′, 42′ and 44′, respectively.

The device in FIG. 1 also includes a limit switch 55 affixed to the chassis 2 to be engaged by a projection 56 that extends downwardly from the support ring 21 for limiting the latter to its operative position. The initial position of the projection prior to the loading of the tape T on the drum 1 is indicated by reference numeral 56′. A switch 57, which is preferably a microswitch or the like, is located adjacent the cassette holding device 3 to be actuated when the holding device is moved, usually downwardly to bring a tape cassette 4 into operative position. Operation of the microswitch 57 connects the DC motor 24 to a source of power so that it begins to rotate and drive the support ring 21. The microswitch 57 remains actuated as long as the tape T remains in its operative position and until the unloading operation is complete.

The invention also provides means to detect the absence of rotation of the magnetic head assembly 1a, which can be another indication of trouble in the mechanism that requires power to be cut off from the DC motor 24. The rotational speed of magnetic head assembly 1a is usually controlled to be 30 r.p.s. and is measured by obtaining voltage pulses from a pulse generator 58 and comparing such pulses with a vertical synchronizing signal of a recording video signal or a control pulse from the fixed magnetic head assembly 15.

Figure 2:
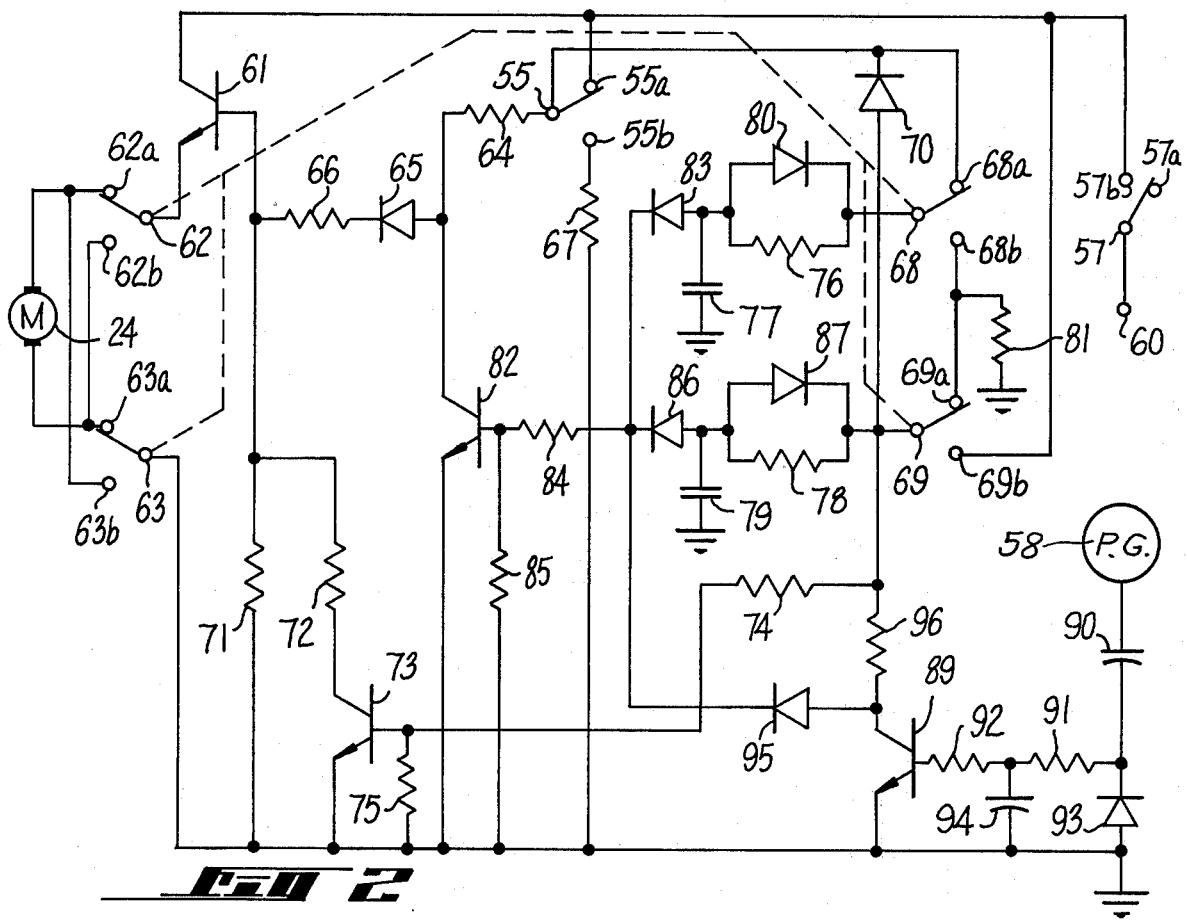
FIG. 2 is a circuit diagram of an overload protection circuit that may be installed in the apparatus of FIG. 1 according to the present invention.

A protecting circuit to be used in association with the mechanical structure of the apparatus in FIG. 1 is shown in FIG. 2. The circuit is connected between a power supply terminal 60 and ground and includes the microswitch 57 connected in series with the emitter-collector circuit of a transistor 61, a switch 62, the motor 24, and another switch 63 ganged with the switch 62. The arm of the switch 63 is connected to ground. Actuation of the switch 57 causes its movable arm to connect with a fixed contact 57b. When the tape T is to be loaded into its operative position, the arms of the switches 62 and 63 connect with their respective fixed contacts 62a and 63a.

The limit switch 55 has two fixed contacts 55a and 55b. The contact 55a is connected to the contact 57b of the switch 57, and the arm of the switch 55 is connected through a resistor 64, a diode 65, and another resistor 66 to the base of the transistor 61. Initially the arm of the switch 55 engages the contact 55a so that a suitable bias is applied to the base of the transistor 61 to cause the latter to conduct current to operate the motor 24. When the loading operation is complete and the projection 56 engages the switch 55, the arm of the switch 55 changes over to the fixed contact 55b, thereby removing operative bias from the transistor 61 and causing the transistor to become nonconductive. The contact 55b is connected to ground through a resistor 67.

When the cassette 4 is to be ejected, and eject button (not shown) is actuated which causes the arms of the switches 62 and 63 to change over to their respective contacts 62b and 63b. This reverses the direction that current can flow through the motor 24. In addition, the arms of two other switches 68 and 69 are ganged with the switches 62 and 63 to be changed over to their respective contacts 68b and 69b when the eject button is actuated. The contact 69b is connected to the contact 57b of the switch 57 that is still closed, and the arm of the switch 69 is connected by way of a diode 70 to the resistor 64 to supply an operative bias to the transistor 61. This makes the transistor 61 conductive again and, since the motor 24 is now connected in the reverse polarity, the support ring 21 is driven in the opposite direction to unload the tape T and return it to the cassette 4. As soon as the ring 21 moves the projection 56 away from the switch 55, the arm of the latter changes back to its fixed contact 55a.

When the support ring 21 returns to its initial position, the holding device 3 is raised by its spring, thereby moving away from the microswitch 57 and allowing the movable contact of that switch to move away from the fixed contact 57b. This interrupts connection to the power supply, and the motor 24 thereupon stops rotation. Usually the eject button is locked in its operative position during the ejecting operation of the support ring 21 and is unlocked simultanuously with the raising of the holding device 3 by the switch. When the eject button is unlocked, the movable contacts of the switches 62, 63, 68 and 69 are changed over to the positions shown in FIG. 2.

The base electrode of the transistor 61 is also connected to ground through a circuit comprising a resistor 71 in parallel with a series circuit comprising a resistor 72 and the emitter-collector circuit of a transistor 73. The base electrode of the transistor 73 is connected by way of a resistor 74 to the arm of the switch 69, and a resistor 75 is connected between the base of the transistor 73 and ground. The transistor 73 is thus conductive because of the supply of proper bias to the switch 69 during the ejection process. When the transistor 73 is conductive, it forms part of a voltage divider that reduces the bias on the base of the transistor 61 to cause the latter to carry less current during the ejection process than during the loading process. As a result, it takes longer to unload tape T from the drum 1 than to load it around the drum.

Both the time normally required for loading the tape T and the time normally required for unloading it are known. These times can easily be measured and are relatively consistent for all cassettes, although they are not absolutely uniform. According to the present invention, a first time constant circuit made up of a resistor 76 connected in series with a capacitor 77 is connected between the movable contact of the switch 68 and ground. A second time constant circuit made up of a resistor 78 in series with a capacitor 79 is connected between the movable contact of the switch 69 and ground. The capacitor 77 is charged by current flowing through the fixed contact 55a of the switch 55 when the movable contact of that switch is in the position shown in FIG. 2. This charging current also flows through a fixed contact 68a and the arm of the switch 68 and through the resistor 76 during the loading operation. During the unloading operation, the capacitor 77 is discharged through a circuit that includes a diode 80 connected in parallel with the resistor 76, the movable arm and a fixed contact 68b of the switch 68, and a resistor 81 to ground.

The voltage across the capacitor 77 is applied to the base electrode of a transistor 82 by way of a diode 83 and a resistor 84. The emitter-collector circuit of the transistor 82 is connected in series between ground and the common circuit point of the diode 65 and the resistor 64 so as to make the transistor 61 non-conductive when the transistor 82 is conductive. A resistor 85 is connected between the base of the transistor 82 and ground to serve as a base resistor for the transistor 82.

The values of the capacitor 77 and the resistor 76 are selected according to the known loading time of the apparatus. The loading time, which is designated $T_L$, in turn, is determined by the rotational speed of the support ring 21. It is desired that the voltage across the capacitor 77 reach a value that will make the transistor 82 start to conduct and thereby make the transistor 61 non-conductive just a little after the normal loading time $T_L$ had elapsed. If some trouble has occurred that slowed the motor 24 too much or stalled it, it could be drawing excessive current and generating excessive heat. Making the transistor 61 non-conductive a little after the normal time $T_L$ will stop such excessive current and prevent overheating.

It would be undesirable, on the other hand, to have the transistor 61 become non-conductive too quickly. The loading time $T_L$ is not precise, and an allowance must be made for the longest reasonable time. One way of determining the time at which the transistor 61 should be made nonconductive is to measure the length of time required to build up excessive heat due to current in the stalled motor 24 and then select the time constant of the RC circuit comprising the resistor 76 and the capacitor 77 such that the voltage across the capacitor 77 will be charged to the conductivity level of the transistor in a length of time greater than $T_L$ but safely less than the time required to build up excessive heat. The latter time would, of course, depend on the actual arrangement of components in the tape apparatus. A warning lamp connected in series with the emitter-collector circuit of the transistor 82 can be used to indicate that some trouble has caused current flow to the motor 24 to be interrupted.

The unloading time $T_U$ begins when the arm of the switch 69 is changed over to its fixed contact 69b. Then the resistor 78 and the capacitor 79 take the place of the resistor 76 and the capacitor 77 in determining the length of time that must pass before the transistor 82 becomes conductive. The RC time constant of resistor 78 and capacitor 79 may be longer than that of resistor 76 and capacitor 77 because the unloading time $T_U$ is deliberately made longer than the loading time $T_L$ by causing the transistor 61 to carry less current during ejection or unloading than during loading, as described previously.

A diode 86 connects the common circuit point of the resistor 78 and the capacitor 79 to the resistor 84 in the base circuit of the transistor 82. A reversely polarized diode 87 is connected in parallel with the resistor to serve the same purpose as the diode 80 and discharge the capacitor 79 to ground through the resistor 81 when the arm of the switch 69 is changed over from the contact 69b to the contact 69a at the time the eject button is released.

Another possible source of trouble is that the motor (not shown) that drives the magnetic head assembly 1a and the take-up and supply reels 5 and 6 may not function properly. If that happens during the unloading operation, the loop of tape T unwrapped from the drum 1 may go slack and get tangled in the apparatus.

To prevent such occurrence a pulse signal from the pulse generator 58 that operates only when the assembly 1a is rotating is applied to the base of a transistor 89 by a series circuit that includes a capacitor 90 and two resistors 91 and 92. A diode 93 is connected between the capacitor 90 and ground and is polarized to detect the positive component of the pulse signal, which charges a capacitor 94.

The emitter of the transistor 89 is connected to ground and the collector is connected by a diode 95 to the common circuit point of the diodes 83 and 86 and the resistor 84. Thus the transistor 82 can be made conductive by a proper voltage applied via any of the diodes 83, 86, or 95. A collector load resistor 96 for the transistor 89 is connected to the arm of the switch 69 so that the transistor 89 cannot conduct except during the unloading operation. If pulses from the pulse generator 58 cease during the unloading operation, the transistor 89 becomes non-conductive and the voltage at its collector rises. This voltage biases the transistor 82 to be conductive more quickly than if the motor 24 became stalled.

If the apparatus is operating correctly during the loading operation, the projection 56 will move to the position where it causes switch 55 to change over to its contact 55b before the capacitor 77 charges to a level that will make conductive the transistor 82, which thus serves as a level detector. As a result, both the collector of the transistor 82 and the capacitor 77 will be connected to ground by way of the resistor 67. If the apparatus is operating correctly during the unloading operation, the transistor 61 will be maintained conductive and the microswitch 57 will be open-circuited before the voltage across the capacitor 79 reaches the level to make the transistor 82 conductive. Thus, the protection circuit in FIG. 2 will not affect the operation of the apparatus unless trouble arises.

Figure 3:
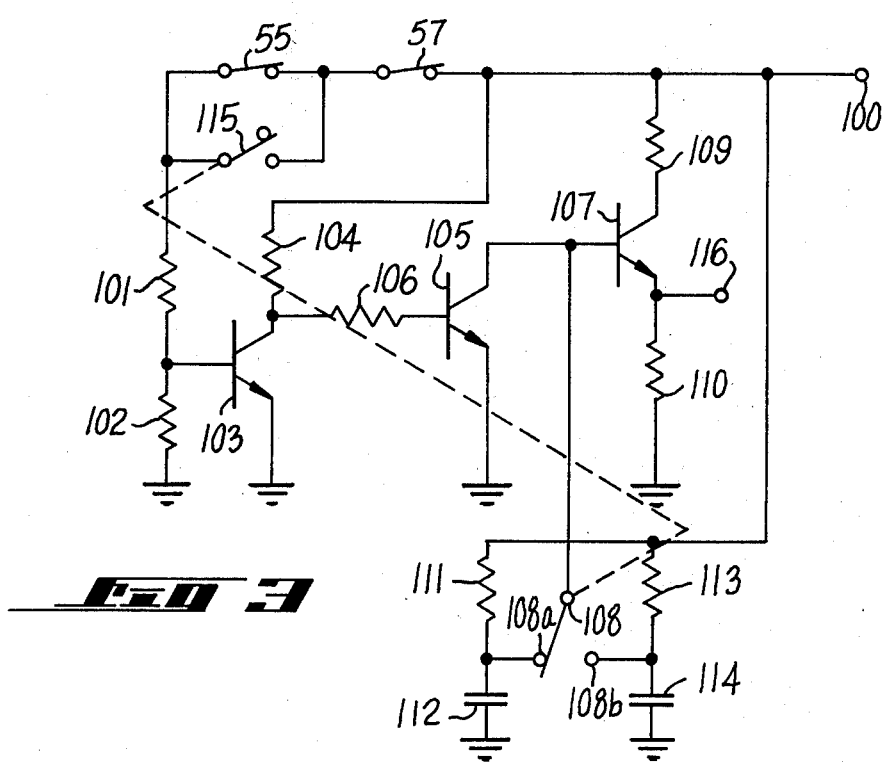
FIG. 3 is a circuit diagram of another embodiment of an overload portection circuit according to the present invention.

FIG. 3 is a schematic diagram of another embodiment of that section of the circuit in FIG. 2 that controls the operation of the transistor 82 during loading and unloading operations.

In FIG. 3 the limit switch 55 is shown as a single-pole single-throw switch connected in series with the microswitch 57. The microswitch 57 is connected to a positive power supply terminal 100 and the two switches are connected in series with two resistors 101 and 102 between the terminal 100 and ground. The base of a grounded-emitter transistor 103 is connected to the common circuit point between the resistor 101 and 102, and a load resistors 104 connects the collector of the transistor 103 to the power supply terminal 100. The collector of the transistor 103 is connected to the base of another grounded-emitter transistor 105 by a resistor 106. The collector of the transistor 105 is connected to the base of a transistor 107 and to the arm of a double-throw switch 108 that has two fixed contacts 108a and 108b. The collector of the transistor 107 is connected to the positive power supply terminal 100 by a voltage-dropping resistor 109. An emitter load resistor 110 is connected between the emitter of the transistor 107 and ground.

The RC time constant circuit operative during the loading operation includes a resistor 111 in series with a capacitor 112 between the positive power supply terminal 100 and ground. The switch contact 108a is connected to the common circuit point between the resistor 111 and capacitor 112. The second RC time constant circuit operative during the unloading operation consists of a resistor 113 and a capacitor 114 connected between the terminal 100 and ground and having a common circuit point connected to the contact 108b. The switch 108 is ganged with a switch 115, but the latter is connected as a single-throw switch in parallel with the limit switch 55. The output terminal 116 of the circuit is connected to the emitter of the transistor 107 and may be connected to the anode of a diode connected in the manner of one of the diodes 83 or 86 in FIG. 2.

In operation of the circuit in FIG. 3, the ganged switches 108 and 115, which are connected to the eject button (not shown), are in the position shown during loading. Initially, the base of the transistor 103 is simply grounded, as shown, so the transistor 105 is conductive and virtually short-circuits the capacitor 112. When the cassette 4 (FIG. 1) is inserted and the holder 3 is moved to dispose such cassette in its operation position, the switch 57 is closed, thereby applying positive bias to the base of the transistor 103, which becomes conductive. This drops the base voltage of the transistor 105 below the level of conductivity and allows the capacitor 112 to begin to charge up. If there is trouble in the mechanism, the voltage across the capacitor 112 will reach a level sufficiently positive to make the transistor 107 conductive and increase the voltage at the output terminal 116. This is the result needed to control the transistor 82 in FIG. 2.

If the support ring 21 in FIG. 1 reaches final position at the completion of the loading process within the time $T_L$, the switch 55 will be actuated by the projection 56. In FIG. 3 such actuation causes the switch 55 to open, making the transistor 103 non-conductive and allowing the transistor 105 to become conductive and short-circuit the capacitor 112 before the transistor 107 becomes conductive.

During unloading, the switches 108 and 115 are changed over. In order to discharge the capacitor 114, the closing of the switch 115 is slightly delayed so that it occurs after the arm of the switch 108 has changed over to the contact 108b and the capacitor 114 has had time to discharge through the conductive transistor 105. That happens very quickly. The switch 115 can then close and the charging of the capacitor 114 can take place in the same manner and with the same result as the charging of the capacitor 112.

What is claimed is:

1. Tape recording and/or reproducing apparatus comprising:
   a rotary head drum assembly comprising a rotary magnetic head and a tape guide drum;
   means to support a supply of tape adjacent said assembly;
   tape guide means movable in one direction from an initial position to a final position for withdrawing a loop of said tape from said supply and wrapping said loop on the periphery of said drum, and in the opposite direction from said final position to said initial position for unwrapping said loop and returning it to said supply;
   electrically energized drive means selectively operable to move said tape guide means in said one direction and in said opposite direction;
   timing means to measure predetermined intervals of time slightly longer than the normal lengths of time required to move said tape guide means in said one direction from said initial position to said final position and in the opposite direction from said final position to said initial position, respectively; and
   means responsive to said timing means to halt the electrical energizing of said drive means during operation of the latter for moving said tape guide means in said one direction and in said opposite direction at the ends of said respective predetermined intervals of time.

2. Tape recording and/or reproducing apparatus according to claim 1; wherein said drive means includes an electric motor, and said means to halt the electrical energizing of said drive means comprises switching means connected in series with said motor to interrupt the supply of current to said motor.

3. Tape recording and/or reproducing apparatus according to claim 1; in which said timing means comprises:
   a time constant circuit comprising a terminal at which a voltage varies from an initial level at the time said tape guide means is first moved in said one direction; and
   level detecting means connected to said terminal to be actuated when said voltage reaches a predetermined value, said level detecting meaens being connected to said means to halt the electrical energizing of the drive means to control the operation thereof.

4. Tape recording and/or reproducing apparatus as defined in claim 3; in which said timing means further comprises
   a second time constant circuit having a different time constant value than said first-named time constant circuit and comprising a second terminal at which a second voltage varies from an initial value when said tape guide means starts to move in said opposite direction from said final position to said initial position, said second time constant having a value such that the voltage at said second terminal reaches said predetermined value shortly after the normal length of time required for said tape guide means to move from said final position to said initial position; and
   a connection between said second terminal and said level detecting means to actuate said level detecting means when the voltage at said second terminal reaches said predetermined value.

5. Tape recording and/or reproducing apparatus according to claim 4; in which said timing means further comprises switching means to connect, alternatively, said first-named time constant circuit or said second time constant circuit in operative relationship with said level detecting means.

6. Tape recording and/or reproducing apparatus according to claim 4; further comprising
   means for rotating said rotary magnetic head upon the return to said supply of the tape unwrapped from said drum during the movement of said tape guide means in said opposite direction;
   additional means connected to said level detecting means and operative to supply an actuating voltage thereto to interrupt the electrical energizing of said drive means while said tape guide means is moving from said final position to said initial position; and
   means responsive to rotation of said rotary magnetic head to produce a control signal to keep said additional means inoperative as long as said rotary magnetic head rotates.

7. Tape recording and/or reproducing apparatus according to claim 6; comprising an OR circuit connecting said first terminal and said second terminal and said additional means to said level detecting means.

8. Tape recording and/or reproducing apparatus according to claim 4; in which said means to halt the electrical energizing of said drive means comprises a first transistor, the emitter-collector output ciruit of said transistor being connected in series with said drive means and the base-emitter input circuit of said transistor being connected to said level detecting means to control the conductivity of said first transistor, said level detecting means comprising a second transistor; and in which said apparatus further comprises:
   a first switch connected in series with said drive means and mechanically placed to be actuated by said means to support said supply of tape to connect said drive means to a source of power; and
   a limit switch connected to control the conductivity of said first transistor to cause said first transistor to become non-conductive when said tape guide means reaches said final position.

9. Tape recording and/or reproducing apparatus according to claim 4; in which said means to halt the electrical energizing of said drive means comprises a first transistor, the emitter-collector output circuit of said transistor being connected in series with said drive means and the base-emitter input circuit of said transistor being connected to said level detecting means to control the conductivity of said first transistor, said level detecting means comprising a second transistor; and in which said apparatus further comprises:
- a first switch mechanically placed to be actuated by said means to support said supply of tape;
- circuit means connecting said first switch to said second transistor to cooperate in controlling the conductivity of said second transistor; and
- a limit switch mechanically placed to be actuated by said tape guide means when said tape guide means reaches said final position and electrically connected in series with said first switch to cooperate in controlling the conductivity of said second transistor.

10. Tape recording and/or reproducing apparatus comprising:
- a rotary head drum assembly including a rotary magnetic head and a tape guide drum;
- means to support a supply of tape adjacent said assembly;
- tape guide means movable in one direction from an initial position to a final position for withdrawing a loop of the tape from said supply and wrapping said loop on the periphery of said drum, and in the opposite direction from said final position to said initial position for unwrapping said loop from the drum;
- means for returning to said supply the tape unwrapped from said drum by the movement of said tape guide means in said opposite direction;
- electrically energized drive means selectively operable to move said tape guide means in said one direction and in said opposite direction;
- timing means operative to measure a predetermined interval of time commencing with the initiation of movement of said tape guide means from one of said positions and which is slightly longer than the normal length of time required for movement of said tape guide means from said one position to the other of said positions;
- means responsive to said timing means to halt the electrical energizing of said drive means at the end of said predetermined interval;
- detecting means for detecting the returning of the tape to said supply during the movement of said tape guide means in said opposite direction from said final position to said initial position; and
- means responsive to said detecting means to halt the electrical energizing of said drive means for moving the tape guide means in said opposite direction upon an interruption in the returning of the tape to said supply.

11. Tape recording and/or reproducing apparatus according to claim 10; in wich said means for returning the tape to said supply is operative simultaneously with the rotation of said rotary magnetic head, and said detecting means includes signal generating means operative in response to said rotation of the rotary magnetic head.

12. Tape recording and/or reproducing apparatus according to claim 10; in which said timing means includes first and second time constant circuits made operative when said drive means is operated to move said tape guide means in said one direction and in said opposite direction for measuring first and second intervals of time, respectively, and said means to halt the electrical energizing of said drive means is operative at the end of said first interval of time and at the end of said second interval of time during movement of said tape guide means in said one direction and in said opposite direction, respectively.

* * * * *